2,984,638

RESINOUS COMPOSITION COMPRISING A VINYL CHLORIDE POLYMER PLASTICIZED WITH AN ADDUCT OF AN ALKYL FUMARATE AND AN ALIPHATIC OLEFINIC ALDEHYDE

Joachim Dazzi, Dayton, Ohio, assignor to Monsanto Chemical Company, St. Louis, Mo., a corporation of Delaware No Drawing. Original application Apr. 18, 1956, Ser. No. 578,887, now Patent No. 2,887,507, dated May 19, 1959. Divided and this application Sept. 19, 1958, Ser. No. 761,940

4 Claims. (Cl. 260—31.8)

This invention relates to aldehyde-esters and more particularly provides new and valuable dicarboxylates, a process of producing the same and vinyl chloride polymers plasticized with said new compounds.

An object of the invention is the provision of new and useful unsaturated aldehydo-esters. Another object of the invention is the preparation of useful addition products of certain olefinic aldehydes and certain esters of fumaric acid. A further object of the invention is to provide for the synthetic resins and plastics, rubber and textile industries, a new class of stable, viscous compounds of high carboxylate content.

These and other objects hereinafter disclosed are provided by the following invention wherein unsaturated aldehyde esters are prepared by the addition reaction of aliphatic mono-olefinic aldehydes of from 5 to 18 carbon atoms and an alkyl fumarate. The reaction is one of simple addition in which one mole of the aldehyde adds to one mole of the fumarate substantially according to the scheme:

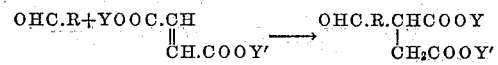

in which R is an aliphatic, mono-olefinic hydrocarbon radical of from 4 to 17 carbon atoms and Y and Y' are alkyl radicals of from 1 to 8 carbon atoms.

Although it is believed that the 1,2-dicarboxylethyl radical is attached at the carbon atom which is adjacent to that which bears the olefinic double bond of the aldehyde, the exact position at which the dicarboxyethyl radical is present is not exactly known. However, it is known that an aldehydo group is present in the addition product and that the addition takes place at a saturated carbon atom and not at the olefinic double bond of the unsaturated aldehyde.

Alkyl fumarates which may be employed in preparing the present adducts are the simple or mixed alkyl fumarates such as methyl, ethyl, n-propyl, isopropyl, butyl, isoamyl, n-hexyl, n-octyl, 2-ethylhexyl fumarate, ethyl methyl fumarate, ethyl n-propyl fumarate, isopropyl n-octyl fumarate, etc.

Aliphatic mono-olefinic aldehydes of from 5 to 18 carbon atoms which add with the alkyl fumarates to yield the present adducts are, for example, α-propylacrolein, tiglic aldehyde, 2-hexenal, 2-decenal, 2-ethyl-2-hexenal, 2-dodecenal, 2-methyl-2-pentenal, octadecenal, etc.

Reaction of the unsaturated aldehyde with the alkyl fumarate to form the 1:1 addition products takes place readily by heating the aldehyde with the fumarate in the presence or absence of an inert diluent or solvent at ordinary or super-atmospheric pressure. When operating at atmospheric pressure temperatures of from, say, 200–300° C. and preferably of from 210–280° C. are used. Usually the lower alkyl fumarates are more reactive than the higher alkyl fumarates. In view of the effect of the reaction conditions and nature of the fumarate and of the aldehyde upon the extent to which the fumarate participates in the reaction, it is recommended that for each initial run optimum operating conditions be experimentally determined.

Since the alkyl fumarates employed in the present reaction are generally miscible with aldehydes under the reaction conditions used, no extraneous solvent or diluent need generally be employed. For successful reaction a diluent may or may not be present. Reaction is advantageously effected in an inert atmosphere, e.g., in nitrogen or in carbon dioxide; and for good yields of product within comparatively short reaction times operation in a closed vessel, i.e., at pressures above atmospheric, is recommended.

In practice, the aldehyde and the fumarate are mixed in a reaction vessel and the mixture is heated, say, at the refluxing temperature thereof, for a time of, say, a few hours to a day. Completion of the reaction may be noted by cessation in change of refractive index upon continued heating.

The present 1:1 olefinic aldehyde-alkyl fumarate adducts are stable, viscous liquids. They are valuable for a variety of commercial and technical uses, e.g., as lubricant adjuvants, as intermediates for the preparation of resins and varnishes, as moisture-proofing agents, etc. They are particularly valuable as plasticizers for polyvinyl chloride and copolymers of at least 70% by weight of vinyl chloride and up to 30% by weight of an unsaturated monomer copolymerizable therewith, for example, vinyl acetate, vinylidene chloride, etc. The present olefinic aldehydo-esters impart great flexibility to vinyl chloride polymers at low temperatures; they are compatible with such polymers and show no exudation of plasticizer even at plasticizer content of up to 50%. Although the quantity of plasticizer will depend upon the particular polymer to be plasticized and upon its molecular weight it is generally found that compositions having from 5% to 50% by weight of the present adducts will, in most cases, be satisfactory for general utility. The good flexibility of the plasticized compositions increases with increasing plasticizer concentration.

The present invention is further illusrated but not limited by the following examples:

Example 1

A mixture consisting of 170 g. (1.35 moles) of 2-ethyl-2-hexenal, 620 g. (2.7 moles) of butyl fumarate and 1 g. of di-tert-butylcatechol (as polymerization inhibitor) was heated in a rocking autoclave at a temperature of 220° C. until the refractive index of the reaction mixture had risen from an initial $n_D^{25}$ 1.4460 to 1.4560. Distillation of the resulting reaction mixture gave 44 g. of (I) a fraction B.P. 150–70° C./1.8 mm. and as residue 476 g. of (II) a viscous material boiling above 180° C. The following analytical data for both (I) and (II) show these materials to be substantially the pure 1:1 2-ethyl-2-hexenal-butyl fumarate adducts, since the calculated value for said 1:1 adduct ($C_{20}H_{34}O_5$) agrees with the found carbon and hydrogen values of (I) and (II).

| Found for (I) | | Found for (II) | | Calcd. for $C_{20}H_{34}O_5$ |
|---|---|---|---|---|
| Percent C | 67.87 | Percent C | 67.98 | 67.8 |
| Percent H | 9.33 | Percent H | 9.65 | 9.6 |

Example 2

A mixture consisting of 423 g. (3.4 moles) of 2-ethyl-2-hexenal, 388 g. (1.7 moles) of butyl fumarate and 1 g. of di-tert-butylcatechol (as polymerization inhibitor) was heated for 12 hours at a temperature of 220° C. in a rocking autoclave. During the heating period the refractive index of the reaction mixture rose from $n_D^{25}$ 1.4464 to 1.4585. Distillation of the resulting reaction mixture gave the following fractions: 142 g. of (I), B.P. 165–185° C./0.7–1.3 mm., $n_D^{25}$ 1.4732, analyzing 69.63% C, 9.15% H and having a sap. eq. of 159.5; 160 g. of (II), B.P. 185–205° C./1.0–1.3 mm., $n_D^{25}$ 1.4672, analyzing 69.01% C and 9.63% H and having a sap. eq. of 177; 89.5 g. of (III), B.P. 205–218° C./1.0–1.3 mm., analyzing 69.38% C and 9.90% H and having a sap. eq. of 181.7. There was obtained as residue 108.5 g. of adduct $n_D^{25}$ 1.4752 analyzing 68.08% carbon and 9.36% hydrogen. Since the calculated values for a 1:1 2-ethylhexenal-butyl fumarate adduct are 67.8% C, 9.6% H and sap. eq.=177, fractions (I)–(III) and the residue consist of the 1:1 adduct essentially.

*Example 3*

Sixty parts of polyvinyl chloride and 40 parts by weight of the 2-ethyl-2-hexenal-butyl fumarate adduct of Example 2 (fraction (III)) were mixed on milling rolls to a homogeneous blend. During the milling there was observed substantially no fuming and discoloration. A molded sheet of the mixture was clear and transparent and substantially colorless. Testing of the molded sheet for low temperature flexibility by the Clash-Berg method gave a value of minus 19.6° C. When subjected to heat at a temperature of 325° F. for a period of 30 minutes the clarity and color of the molded product was substantially unchanged. Tests of the water resistance properties of the plasticized material by immersing the molded specimen for 24 hours in water gave a water absorption value of 0.66% and a solids loss value of 0.14%.

Kerosene resistance of the molded test specimen of the adduct of Example 2 (fraction (III)) was determined as follows:

A 2″ diameter, 40-mil disc was suspended in a 50° C. oven for a 3-hour conditioning period to eliminate water, then cooled and weighed. The conditioned sample was then immersed in 400 ml. of kerosene for a period of 24 hours, at 27° C. The sample was then removed from the kerosene, blotted dry and suspended in a force-draft 80° C. oven for 4 hours. The sample was then cooled and weighed. The percent loss in weight thus determined, i.e., the kerosene extraction value, was found to be 2.3%.

*Example 4*

Evaluation of the residue (II) of Example 2 using the procedures described in Example 3, gave a low temperature flexibility value of minus 14.5° C., a solids loss of 0.09%, a water-absorption value of 0.49% and a kerosene extraction value of 2.6%.

Adducts of other alkyl fumarates and of other olefinic aldehydes likewise possess very good plasticizing properties for vinyl chloride polymers. Thus, by employing a 40 parts by weight of the adduct of hexenealdehyde, of tiglic aldehyde or of 2-dodecenal and n-octyl fumarate, or isopropyl methyl fumarate with 60 parts by weight of polyvinyl chloride or with 60 parts by weight of a vinyl chloride-vinyl acetate copolymer known to the trade as "Vinylite" there may be obtained clear, colorless compositions of very good flexibility and stability.

While the above examples show only compositions in which the ratio of plasticizer to polymer content is 40:60, this ratio being employed in order to get comparable efficiencies, the content of ester to polyvinyl chloride may be widely varied, depending upon the properties desired in the final product. For many purposes a placticizer content of, say, from only 10 percent to 20 percent is preferred. The present adducts are compatible with polyvinyl chloride over wide ranges of concentrations, up to 50 percent of adduct based on the total weight of the plasticized composition yielding desirable products.

Although the invention has been described particularly with reference to the use of the present adducts as plasticizers for polyvinyl chloride, these adducts are advantageously employed also as plasticizers for copolymers of vinyl chloride, for example, the copolymers of vinyl chloride with vinyl acetate, vinylidene chloride, etc. Preferably, such copolymers have a high vinyl chloride content, i.e., a vinyl chloride content of at least 70 percent by weight of vinyl chloride and up to 30 percent by weight of the copolymerizable monomer.

The plasticized polyvinyl halide compositions of the present invention have bood thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized products does not impair the valuable properties of the adducts. The present adducts are of general utility in softening vinyl chloride polymers. They may be used as the only plasticizer components in a compounded vinyl chloride polymer or they may be used in conjunction with other plasticizers.

This application is a division of my copending application, Serial No. 578,887, filed April 18, 1956, which issued as Patent No. 2,887,507, dated May 19, 1959.

What I claim is:

1. A resinous composition comprising a resinous polymer selected from the group consisting of homopolymers of vinyl chloride and copolymers of vinyl chloride with mono-ethylenic unsaturated monomers, said copolymers containing at least 7°% by weight of vinyl chloride combined therein, and said polymer being plasticized with an adduct having the formula

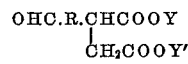

$$\begin{array}{c} \text{OHC.R.CHCOOY} \\ | \\ \text{CH}_2\text{COOY}' \end{array}$$

in which R is an alkenylene radical of from 4 to 17 carbon atoms and Y and Y' are alkyl radicals of from 1 to 8 carbon atoms.

2. A resinous composition comprising polyvinyl chloride plasticized with an adduct having the formula

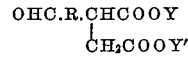

$$\begin{array}{c} \text{OHC.R.CHCOOY} \\ | \\ \text{CH}_2\text{COOY}' \end{array}$$

in which R is an alkenylene radical of from 4 to 17 carbon atoms and Y and Y' are alkyl radicals of from 1 to 8 carbon atoms.

3. A resinous composition comprising a copolymer of at least 70% by weight of vinyl chloride and up to 30% by weight of a mono-ethylenically unsaturated monomer copolymerizable therewith, said copolymer being plasticized with an adduct having the formula

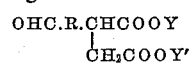

$$\begin{array}{c} \text{OHC.R.CHCOOY} \\ | \\ \text{CH}_2\text{COOY}' \end{array}$$

in which R is an alkenylene radical of from 4 to 17 carbon atoms and Y and Y' are alkyl radicals of from 1 to 8 carbon atoms.

4. A resinous composition comprising polyvinyl chloride plasticized with an adduct having the formula

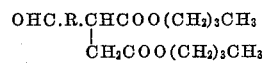

$$\begin{array}{c} \text{OHC.R.CHCOO(CH}_2)_3\text{CH}_3 \\ | \\ \text{CH}_2\text{COO(CH}_2)_3\text{CH}_3 \end{array}$$

in which R is an ethylpentenylene radical having the ethyl group attached at the carbon atom of the pentenylene chain which is vicinal to the OHC— radical.

No references cited.